United States Patent [19]

Montoya et al.

[11] 3,815,721

[45] June 11, 1974

[54] COIN OPERATED SECURITY LOCK RACK FOR BICYCLES

[76] Inventors: Margarito F. Montoya, 7653 Washington Ave., Whittier, Calif. 90602; Peter F. Carrilo, 8429 Daleberry Dr., Pico Rivera, Calif. 90660

[22] Filed: Dec. 15, 1972

[21] Appl. No.: 315,654

[52] U.S. Cl............................ 194/40, 70/18, 70/227
[51] Int. Cl............................................ G07f 17/10
[58] Field of Search........... 70/14, 15, 18, 226, 227, 70/235; 194/40, 49, 64; 211/5, 19, 20

[56] References Cited
UNITED STATES PATENTS
617,693 1/1899 Shultz.................................. 194/40
1,440,278 12/1922 Chochol.............................. 70/227
FOREIGN PATENTS OR APPLICATIONS
620,015 3/1949 Great Britain....................... 70/227

Primary Examiner—Stanley H. Tollberg
Assistant Examiner—David A. Scherbel
Attorney, Agent, or Firm—J. Carroll Baisch

[57] ABSTRACT

A coin operated security rack apparatus for bicycles to minimize the danger of thefts, the apparatus having a bicycle rack with locking means for both front and rear wheels. The locking means for the wheels includes a shaft for securing the locking means in the locked position after the locking means have been locked on the wheels. A coin operated mechanism controls the shaft and locks it in the locking position so that the locking means for the wheels cannot be open until the coin operated mechanism is unlocked to thereby unlock the shaft so that it can be moved to a position for unlocking the locking means for the wheels.

7 Claims, 11 Drawing Figures

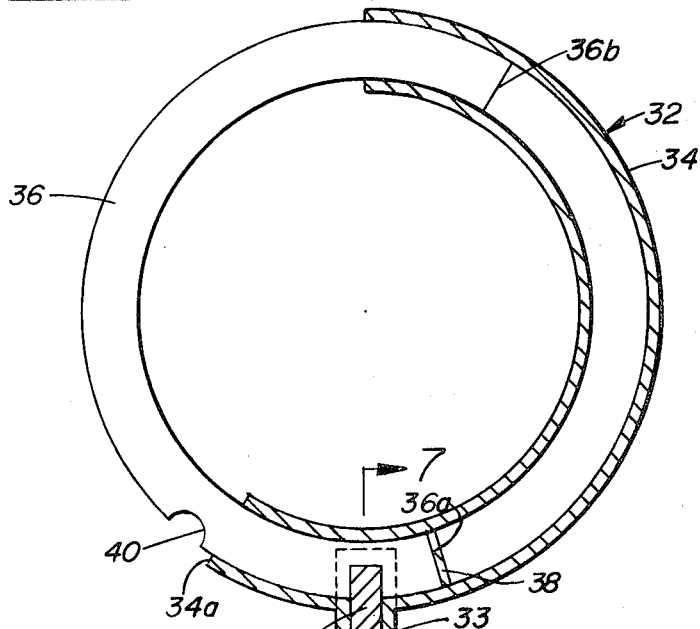
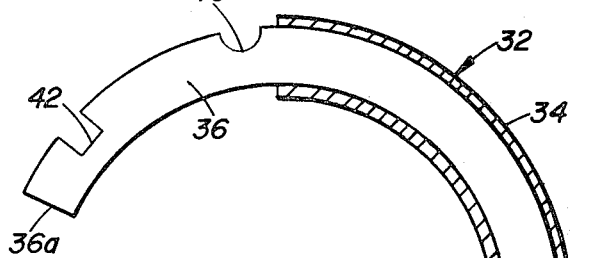
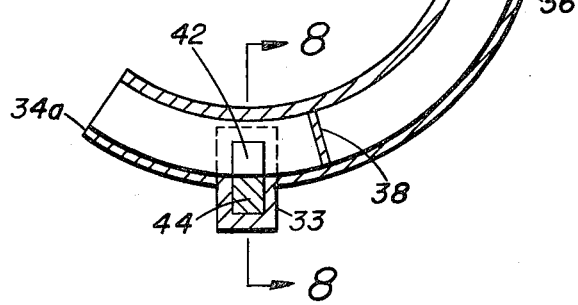
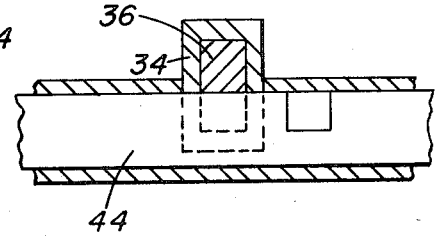
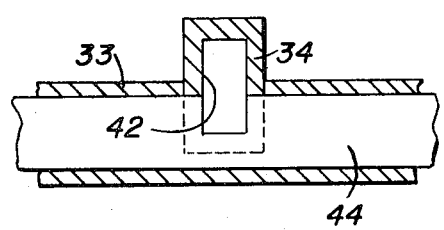

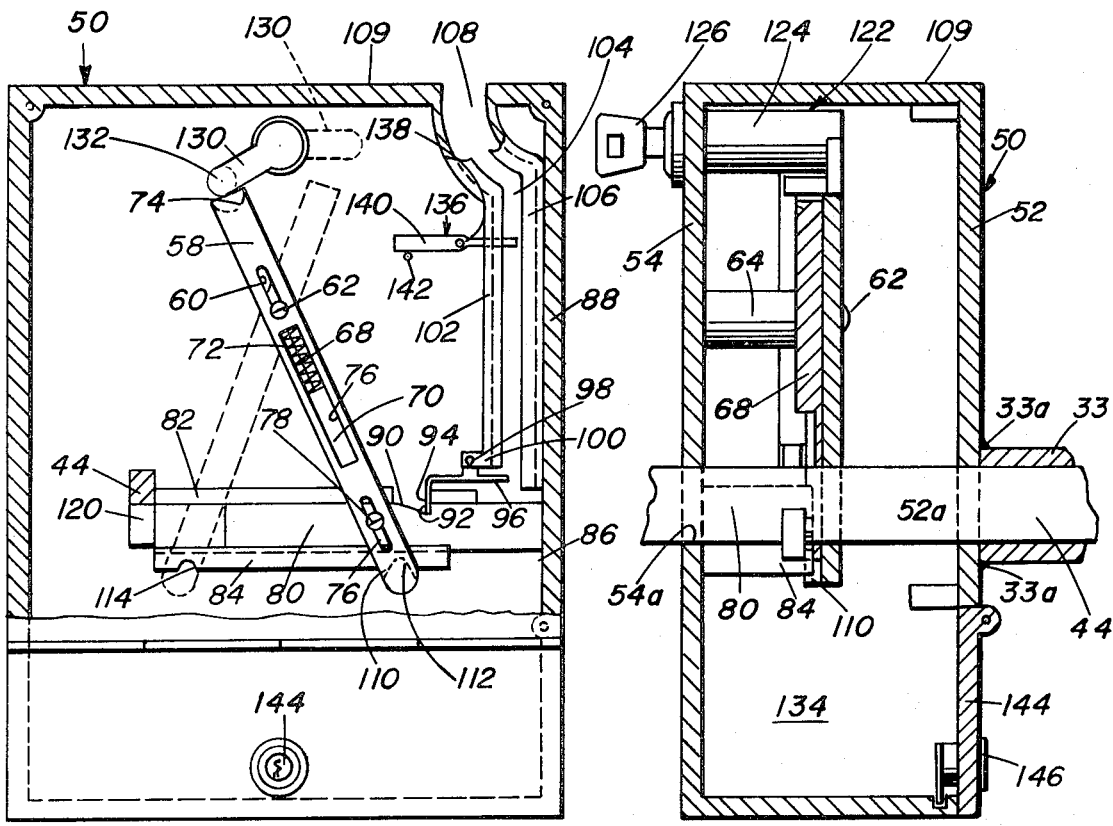

COIN OPERATED SECURITY LOCK RACK FOR BICYCLES

BACKGROUND OF THE INVENTION

1. Field of the Invention

This invention relates generally to a bicycle rack to which bicycles may be locked, the locking means being controlled by a coin operated locking mechanism.

2. Description of the Prior Art

Various apparatus for locking bicycles to minimize theft have been proposed. Generally, as far as applicant is aware, such locks are merely attached to a single wheel of a bicycle so that the bicycle may not be ridden. Some of these prior art devices are arranged to be fixed to a bicycle mud guard. One arrangement of which I am aware, provides a coin controlled lock for securing or locking one wheel of a bicycle to a holder for bicycles.

These various arrangements have well-known disadvantages. Some of them may be readily broken or the bicycle may be bodily picked up and carried away.

SUMMARY OF THE INVENTION

The present invention is a coin operated security locking apparatus for locking both front and rear wheels of bicycles to a rack to thereby minimize the danger of thefts. Two locking rings are provided for the respective front and rear wheels of bicycles for securing the bicycle to a rack which is difficult to move. Detaching a bicycle locked to the rack would be extremely difficult and would require considerable time, a situation which a thief would not be apt to get into.

There is a locking shaft adapted to be actuated between an unlocked position and a position for securing both rings in the locked position and there is a coin operated locking mechanism which has a lock from which the key cannot be removed when the locking mechanism is unlocked. The locking mechanism cannot be actuated until a suitable coin is inserted into the coin box.

The locking rings are adapted to be manually actuated between an open and a closed or locked position and when actuated to the closed or locked position, the locking shaft is moved to the locking position to prevent the locking rings from being open.

When it is desired to secure a bicycle to the rack, the locking rings are moved to the closed position with the front and rear wheels of the bicycle encircled thereby. The locking shaft is then moved to the position whereat it locks the rings in the closed position. A suitable coin is then dropped into the coin box for releasing the tumbler mechanism of the locking mechanism of the coin box and the key then moves a belt that prevents the locking shaft from being retracted so that the bicycle is then securely attached or locked to the rack.

OBJECTS AND ADVANTAGES OF THE INVENTION

It is an object of the invention to provide apparatus for locking bicycles to a bicycle rack.

It is another object of the invention to provide apparatus of this character whereby both front and rear wheels of a bicycle are securely attached or locked to the rack.

Still another object of the invention is to provide apparatus of this character that will minimize bicycle thefts so as to promote piece of mind to bicycle owners.

A further object of the invention is to provide apparatus of this character that is relatively inexpensive to manufacture.

A still further object of the invention to provide apparatus of this character that is easy to operate and highly effective in securing bicycles to the racks.

The characteristics and advantages of the invention are further sufficiently referred to in connection with the following detailed description of the accompanying drawings, which represent one embodiment. After considering this example, skilled persons will understand that many variations may be made without departing from the principles disclosed and I contemplate the employment of any structures, arrangements or modes of operation that are properly within the scope of the appended claims.

BRIEF DESCRIPTION OF THE DRAWINGS

Referring to the drawings, which are for illustrative purposes only and are generally schematic:

FIG. 5 is an enlarged sectional view of one of the locking rings in the closed position;

FIG. 6 is a similar view showing the ring in the open position;

FIG. 7 is an enlarged sectional view taken on line 7—7 of FIG. 5 and showing the bolt of the coin operated locking mechanism in the locked position;

FIG. 8 is a similar sectional view taken on line 8—8 of FIG. 6;

FIG. 9 is a partial sectional view of an alternative ring arrangement;

FIG. 10 is a sectional view of the coin operated mechanism taken on line 10—10 of FIG. 2; and FIG. 11 is a sectional view taken on line 11—11 of FIG. 10.

DESCRIPTION OF THE PREFERRED EMBODIMENTS

Figure 1:
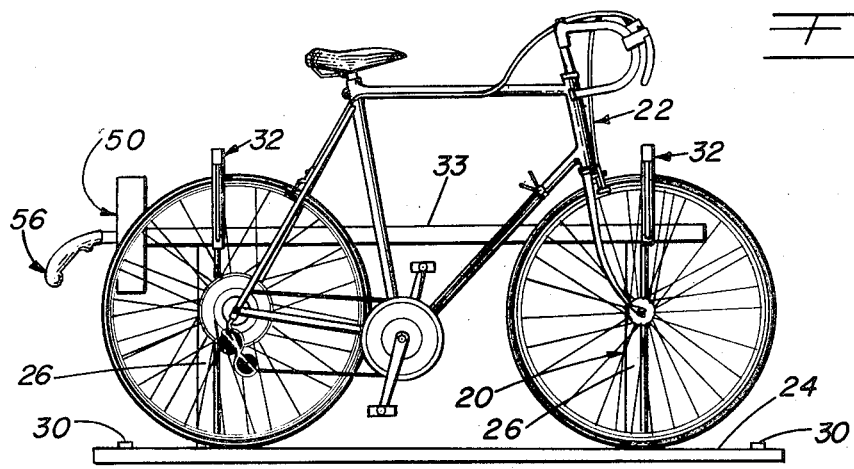
FIG. 1 is a side elevational view of a rack having a bicycle secured thereto by the present invention.
Figure 2:
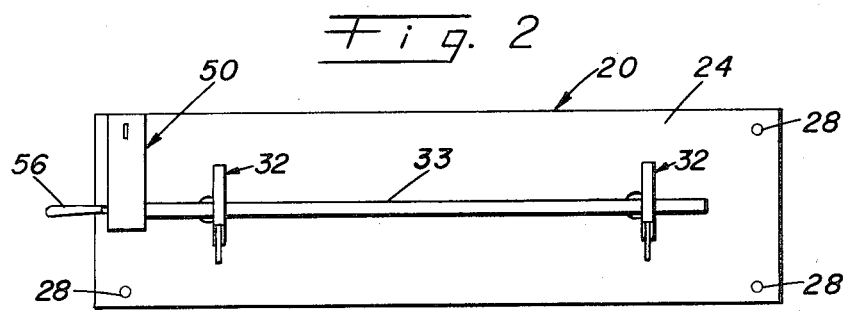
FIG. 2 is a plane view of the rack and locking apparatus per se.
Figure 3:
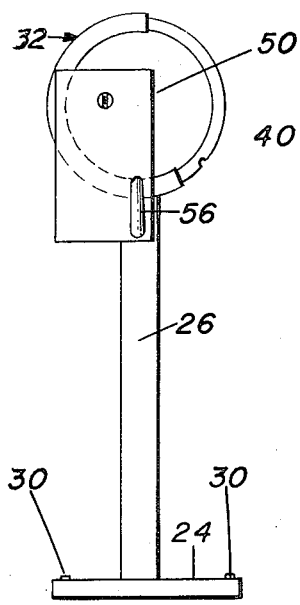
FIG. 3 is an enlarged end elevational view of the apparatus locking at the coin box end thereof.
Figure 4:
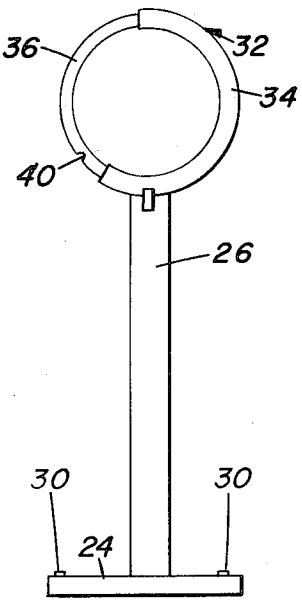
FIG. 4 is an enlarged elevational view of the opposite end.

Referring more particularly to the drawings, there is shown in FIG. 1 a bicycle rack indicated generally at 22, is locked. The bicycle rack 20 comprises a base 24 to which upstanding posts 26 have their lower ends attached. The base may be secured to a fixed support such as, for example, a slab of cement or the like, there being holes 28 for bolts embedded in the cement. The bolts have heads 30, as shown in FIG. 1. While two posts are disclosed, it is to be understood that there may be additional posts if desired and the rack may be much longer to accommodate a plurality of bicycles.

The posts are of metal and there is a locking ring, indicated generally at 32 secured to a tubular guide 33, secured to the posts adjacent their upper end by means of welding or other suitable means, it being understood that the rings are of suitable metal material such as steel for example.

Referring to FIGS. 5 and 6, the rings 32 are shown as having an arcuate tubular part 34 secured to the tubular guide 33 or by welding or the like. There is an arcuate rod 36 within the arcuate tubular part 34 which is movable between an open position and a locked position. The arcuate tubular part 34 has a baffle or partition 38 adjacent one end which is adapted to serve as a stop for the arcuate rod in both the open position and locked position. In FIG. 5, the ring is shown in the locked position wherein the arcuate rod has both ends disposed within the arcuate tubular part 34. The end 36a of the arcuate rod adjacent the baffle or partition 38 is abutting against said baffle or partition. Movement of the arcuate rod is affected manually, there being a notch 40 for reception of the operator's finger or the like. In FIG. 6, the opposite end of the arcuate rod 36 abuts the baffle or partition 38. When the locking rod is in this position, the locking ring is in the open position and there is a substantial space between the end 36a of the arcuate rod and the lower end 34a of the arcuate tubular part. Arcuate rod 36 has a notch 42 in its outer periphery for reception of a locking shaft 44 when the arcuate rod 36 is in the closed or locked position as best shown in FIG. 5.

Locking shaft 44 is slidably disposed within the tubular guide 33 when the locking shaft is in one position, notches 42 are positioned for reception of the adjacent ends of the arcuate rod 36, it being understood that the arcuate rods 36 are in an open position. The arcuate rods 36 may then be moved to their closed position, passing through the notches 42. When the arcuate rods are in this closed position, the ends 36a thereof abut the baffles or partitions 38. Locking shaft 44 may then be moved to the locking position with a part of the shaft 44 disposed in the notches 42 of the arcuate rods 36. Thus, the arcuate rods are securely locked in the closed position with both ends thereof disposed within the tubular part 34 so as to form a complete circle.

Control of the locking shaft 44 is effected by a coin operated mechanism indicated generally at 50 having housing side walls 52 and 54 with aligned openings 52a and 54a through which an end portion of the locking shaft 44 extends. At its free end adjacent the coin operated mechanism, locking shaft 44 has a handle 56 for actuating same longitudinally.

Within the housing of the coin operated mechanism, there is mounted a sliding bar 58 having a slot 60 therein for operable reception of a screw 62 which functions as a pivot pin, screw 62 being screwed into a boss 64 secured to the inner side of wall 54. Spaced downwardly from the slot 60 is a second slot indicated at 66. Behind the sliding bar 58, is an operating bar 68 securing the dividing bar and operating bar together for simultaneous pivotal movement relative to the pin 62. Operating bar 68 has a flange 70 that is slidably disposed in the second slot 66 of the sliding bar, the flange being of less length than the slot 66 and normally is at the lower end of said slot. Between the upper end of the flange 70 and the upper end of the slot 66, is a spring 72 urging the sliding bar upwardly with pin 62 normally at the lower end of slot 60 and limiting upward movement of sliding bar 58. Operating bar 68 is also pivoted on the screw or pivot pin 62 and has an arcuate shaped recess 74 in its upper end. Sliding bar 58 has a third slot 76 adjacent its lower end for reception of a screw or pin 78 fixed in the side of a bolt 80 slidable longitudinally between bar or guide members 82 and 84. Normally, the right hand end 86 of the belt 80, as viewed in FIG. 10, is in abutment against end wall 88 of the housing. Bolt 80 is provided with a notch 90 having a shoulder 92 at one end against which a depending flange 94 of a lever 96 normally engages. Lever 96 is pivoted on a pin 98 disposed in the flange 100 of a guide member 102 defining one side of a coin chute 104, the other side of the chute being defined by a member 106 parallel with and spaced laterally therefrom. At its upper end, the chute communicates with a coin slot 108 in the top wall 109 of the housing. It is to be noted that the end of lever 96 opposite the flange 94, extends into the path of a coin passing down the chute 104 so that said coin will cause the lever 96 to move in a clockwise direction so that the flange 94 disengages the shoulder 92. The end of the lever 96 having the flange is heavier than the opposite end so that the lever normally is in the horizontal position with the flange 94 engaging the shoulder 92.

At its lower end, the sliding bar is provided with a lug 110 normally disposed in a notch 112 in the underside of the guide member 84. Spaced longitudinally from the notch 112, there is a second notch 114 in the underside of the guide member 84, said notch 114, as viewed in FIG. 10, being spaced to the left of the notch 12. As above described, side walls 52 and 54 of the housing, have openings 52a and 54a in which the locking shaft 44 is slidable. The guide tube 33 is secured to the side wall 52 of the housing by welding 33a or the like, the locking shaft being slidable in said guide or tube 33. The end portion of the locking shaft that extends through the opening 54a has the handle 56 and there is a notch 120 in the locking shaft that is in register with the bolt 80 when said locking shaft is in the locking position.

Adjacent the top wall 109 of the housing, there is a key operated lock indicated generally at 122 having a barrel 124, said lock being of the well known type wherein the key, indicated at 126, cannot be removed when the lock is in the unlocked position. The outer end of the barrel 124 of the lock 122, is secured to wall 54 in the usual well known manner to prevent removal of said lock. Lock 122 is provided with an arm 130 having a stud 132 adjacent its free end, said stud being cylindrical and positioned for entrance into the arcuate shaped recess 74. Simultaneously, the stud acts on the upper end of the sliding bar and moves same downwardly as said lug moves into said recess 74 to disengage the lock 110 from the notch 112 against the force of spring 72. Arm 130 is rotated counterclockwise, as viewed in FIG. 10, when the key 126 is actuated to the locking position. As the key 126 is rotated to the locking position, the arm 130 moves counter clockwise and moves the stud 132 into the recess 74 of the operating bar and forces the sliding bar downwardly to disengage lug 110 from notch 112. It then rotates said operating bar and sliding bar in the clockwise direction. As the arm 130 is rotated, the operating bar rotates in the clockwise direction and simultaneously rotates the sliding bar in the same direction since the flange 70 ties the operating bar and sliding bar together for rotation on the pin 62. The movement of the sliding bar downwardly on the operating bar effects disengagement of the lug 110 from the recess 112 so that the operating bar and sliding bar will rotate in the clockwise direction on pivot pin 62 as the key is moved to the locking position whereat the arm 130 is moved to the dotted line position as shown in FIG. 10. When arm 130 reaches the dotted line position, the sliding bar 58 is moved upwardly by the spring 72 so that the lug 110 enters the recess 114 and releasably secures the sliding bar in said dotted line position. With clockwise rotation of the sliding bar, the bolt 80 is moved leftwardly, and with the locking shaft in the locking position, the bolt 80 will enter the notch 120 and prevent the locking shaft from being moved to the unlocked position. Reverse movement of the key 126 will effect a reverse movement of the operating bar and the sliding bar and move the mechanism to the unlocked position.

In order to actuate the mechanism to the locking position, a coin must be dropped in the coin slot and as the coin moves downwardly in the coin chute 104, it will drop onto the end of the lever 96 that is in alignment with the lower end of the chute. The weight of the coin will cause lever 96 to rotate in the clockwise direction until the coin engaged end of said lever rests on the adjacent portion of the bolt and effecting disengagement of the flange 94 from the shoulder 92. Thus, the mechanism can be actuated to the locking position as above described. When the bolt is moved to the locking position, the coin which has been held on the inner end of lever 96 is free to drop into the coin compartment 134 permitting the lever to move in the counter clockwise direction with the free end of the flange 94 slidably engaging the upper side of the bolt so that said flange will drop into notch 90 when the bolt is returned to the unlocked position.

A lever 136 is pivotly mounted on a pin 138 secured to at least one of the side walls, said lever having one end projecting through an opening provided therefore into the coin chute. The opposite end 140 of the lever is weighted and a stop pin 142 is provided to limit counter clockwise movement of said lever. Normally, the lever 136 is in the horizontal position and a coin engaging the end of the lever in the chute is of sufficient weight to rotate the lever clockwise and permit the coin to drop to the bottom of the chute to actuate lever 96. After the coin has passed by the lever 136, the lever will return to the normal horizontal position and prevent removal of a coin upwardly and out of the chute.

The coin compartment is provided with a pivoted door 144 having a lock 146 normally locking the door in the closed position. Lock 146 can be unlocked by a key inserted into the key slot 148 so that the door may be opened and coins in the coin compartment removed therefrom.

The invention and its attendant advantages will be understood from the foregoing description and it will be apparent that various changes may be made in the form, construction and arrangement of the parts without departing from the spirit or scope thereof or sacrificing its material advantages, the arrangement hereinbefore described being merely by way of example and I do not wish to be restricted to the specific form shown or uses mentioned except as defined in the accompanying claims.

I claim:

1. A bicycle rack, said rack including upright members spaced apart from each other;

bicycle attaching means secured to said upright members for attaching both wheels of a bicycle to said upright members, said means having open and closed positions; a locking shaft operably connected to said bicycle attaching means and movable between a position whereat it locks the attaching means in the closed position when said attaching means are closed and a position permitting said attaching means to be moved to the open position;

and a coin operated mechanism for releasably locking the locking shaft in the locking position for locking the attaching means in the closed position.

2. The invention defined by claim 1, wherein the bicycle attaching means are adapted to encircle the tire and rim of the respective wheels of the bicycle when said attaching means are in the closed position.

3. The invention defined by claim 1, wherein each of the attaching means comprises an arcuate tubular part, and an arcuate rod slidable in said arcuate tubular part, the ends of said rod being disposed in the arcuate tubular part when said bicycle attaching means is in the closed position.

4. The invention defined by claim 3, including a baffle within the arcuate tubular part for limiting opening and closing movements of the arcuate rod.

5. The invention defined by claim 4, wherein the arcuate rod has a notch therein for slidable reception of the locking shaft when the attaching means is in the closed position thereby preventing opening movement of the arcuate rod when the locking shaft is in the locking position.

6. The invention defined by claim 5, including a coin operated mechanism for locking the locking shaft in the locking position.

7. The invention defined by claim 6, wherein the coin operated mechanism includes a housing and a key operated lock secured within the housing, said lock retaining the key therein when the lock is in the unlocked position.

* * * * *